June 12, 1928.

G. WEISS 1,673,030

VENDING MACHINE

Filed May 26, 1923

Inventor:
George Weiss,
By Fisher, Towle, Clapp & Soans
Attys.

June 12, 1928.
G. WEISS
1,673,030
VENDING MACHINE
Filed May 26, 1923
6 Sheets-Sheet 2
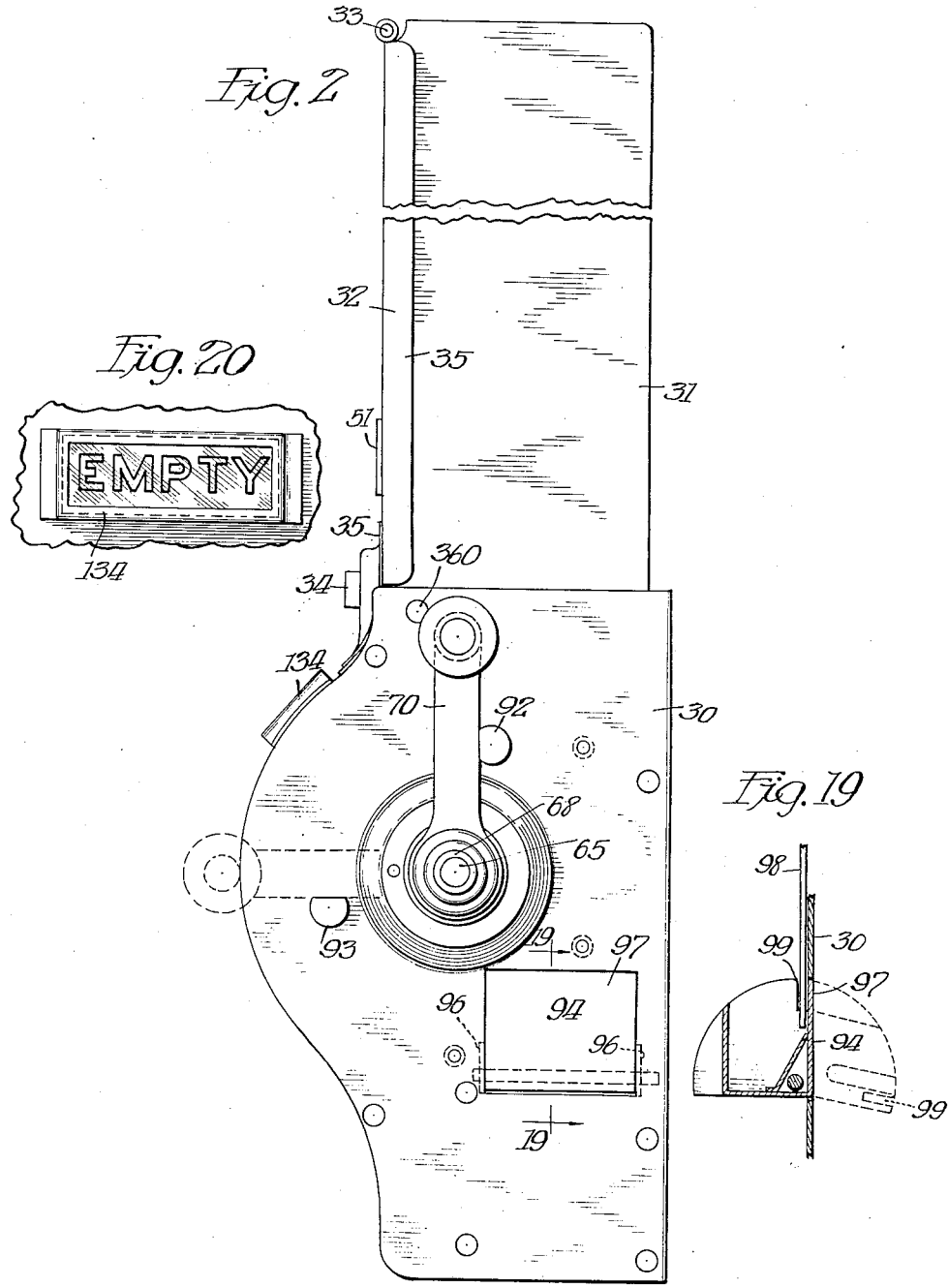

June 12, 1928.
G. WEISS
1,673,030
VENDING MACHINE
Filed May 26, 1923          6 Sheets-Sheet 3
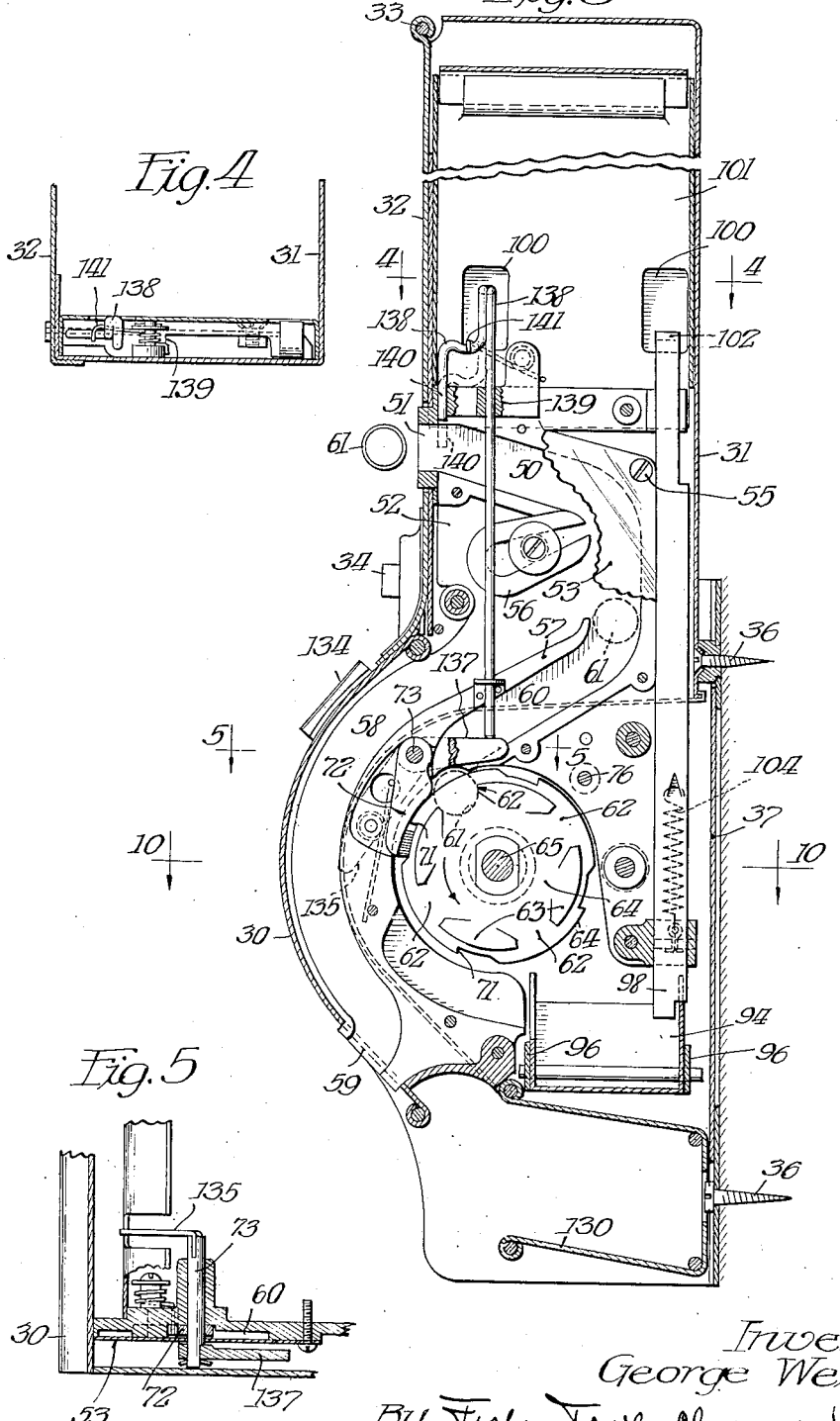
Inventor:
George Weiss,
By Fisher, Towle, Clapp & Soans
Attys.

June 12, 1928.                                        1,673,030
G. WEISS
VENDING MACHINE
Filed May 26, 1923          6 Sheets-Sheet 4
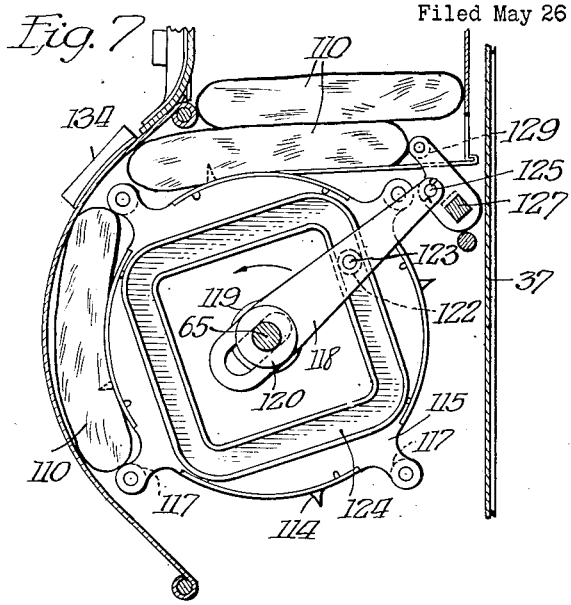
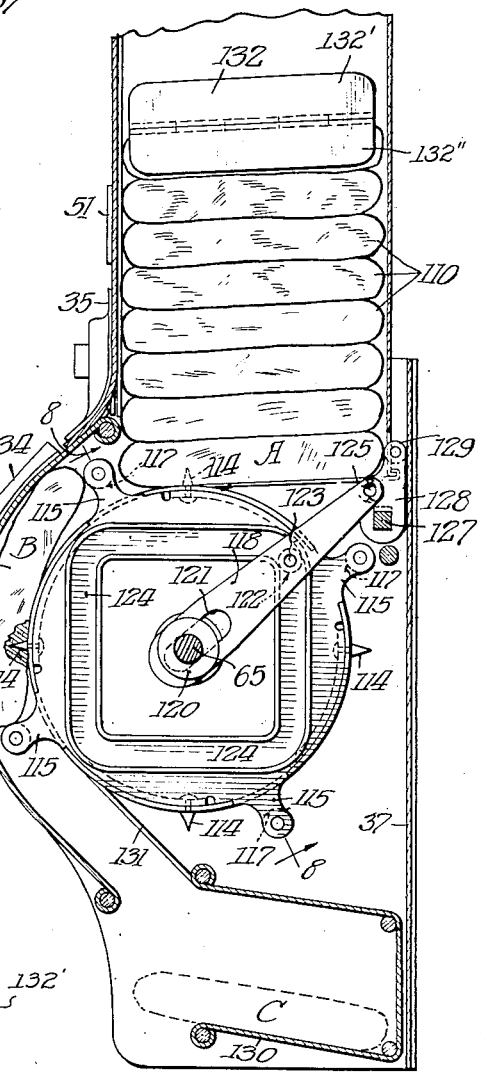
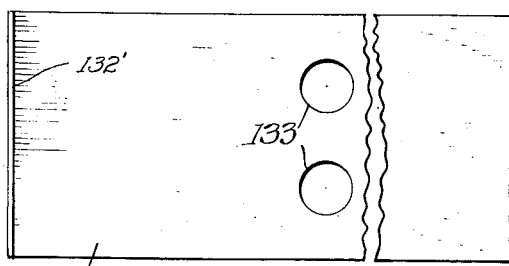
Inventor:
George Weiss,
By Fisher, Tower, Clapp & Soans
Attys.

June 12, 1928.
G. WEISS
1,673,030
VENDING MACHINE
Filed May 26, 1923
6 Sheets-Sheet 5
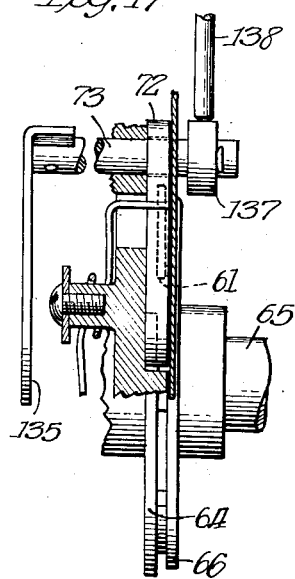
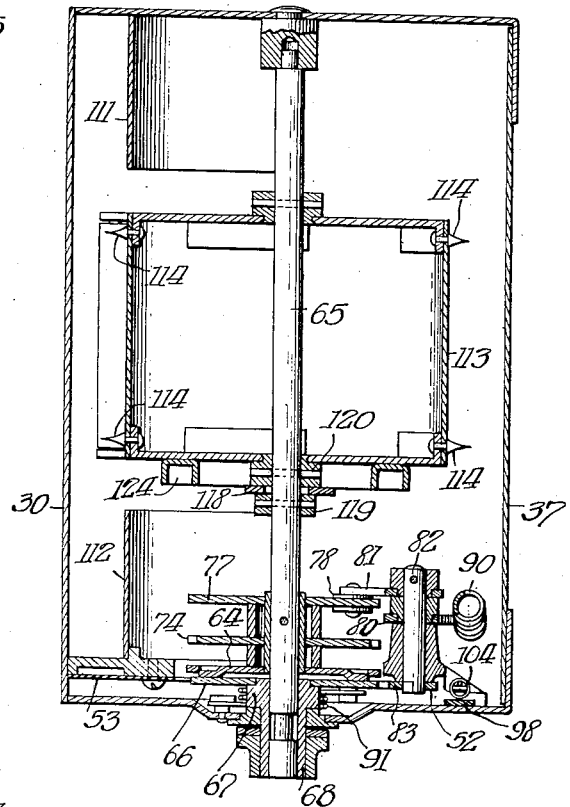
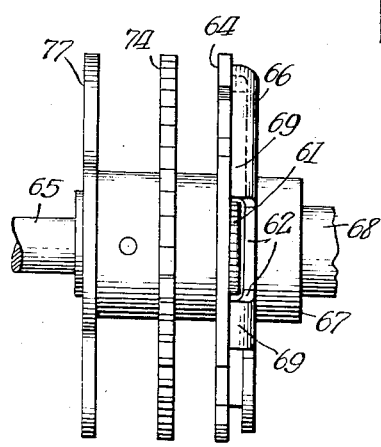
Inventor:
George Weiss,
By Fisher, Towle, Clapp & Soans
Attys.

June 12, 1928.

G. WEISS

VENDING MACHINE

Filed May 26, 1923  6 Sheets-Sheet 6

1,673,030

Inventor:
George Weiss,
By Fisher, Towle, Clapp & Soans
Attys.

Patented June 12, 1928.

1,673,030

UNITED STATES PATENT OFFICE.

GEORGE WEISS, OF CHICAGO, ILLINOIS, ASSIGNOR, BY MESNE ASSIGNMENTS, TO INTERNATIONAL CELLUCOTTON PRODUCTS CO., OF CHICAGO, ILLINOIS, A CORPORATION OF DELAWARE.

VENDING MACHINE.

Application filed May 26, 1923. Serial No. 641,584.

This invention relates to coin-controlled apparatus but more particularly to machines for vending comparatively bulky articles, such as sanitary napkins, and has for its primary object to provide a new and improved machine of this type.

Further objects of the invention are to provide an improved article-discharging mechanism, to prevent fraudulent removal of the articles from the machine, to provide a simple and durable coin-controlled mechanism which cannot be rendered operable by slugs or by coins of a denomination other than that for which the machine is intended, to prevent injury to the article during the operation of the discharging mechanism, and to prevent the insertion of a coin when the article container is empty.

The many other objects and advantages of my invention will be better understood by reference to the following specification when considered in connection with the accompanying drawings illustrating a selected embodiment thereof, in which:—

Fig. 2 is a side elevation.

Fig. 3 is a vertical section on the line 3—3 of Fig. 1.

Fig. 4 is a detail horizontal section on the line 4—4 of Fig. 3.

Fig. 5 is a detail horizontal section on the line 5—5 of Fig. 3.

Fig. 6 is a vertical section on the line 6—6 of Fig. 1 with the parts in their normal or initial position.

Fig. 7 is the same as Fig. 6 except that the article-discharging operation has started.

Fig. 8 is a detail section on the line 8—8 of Fig. 6.

Fig. 9 is a top plan view of the weight.

Fig. 10 is a horizontal section on the line 10—10 of Fig. 3.

Figs. 17 and 18 are enlarged detail views.

Fig. 19 is a sectional view on the line 19—19 of Fig. 2, and

Fig. 20 is a detail front view of the indicating window in the casing.

Figure 1:
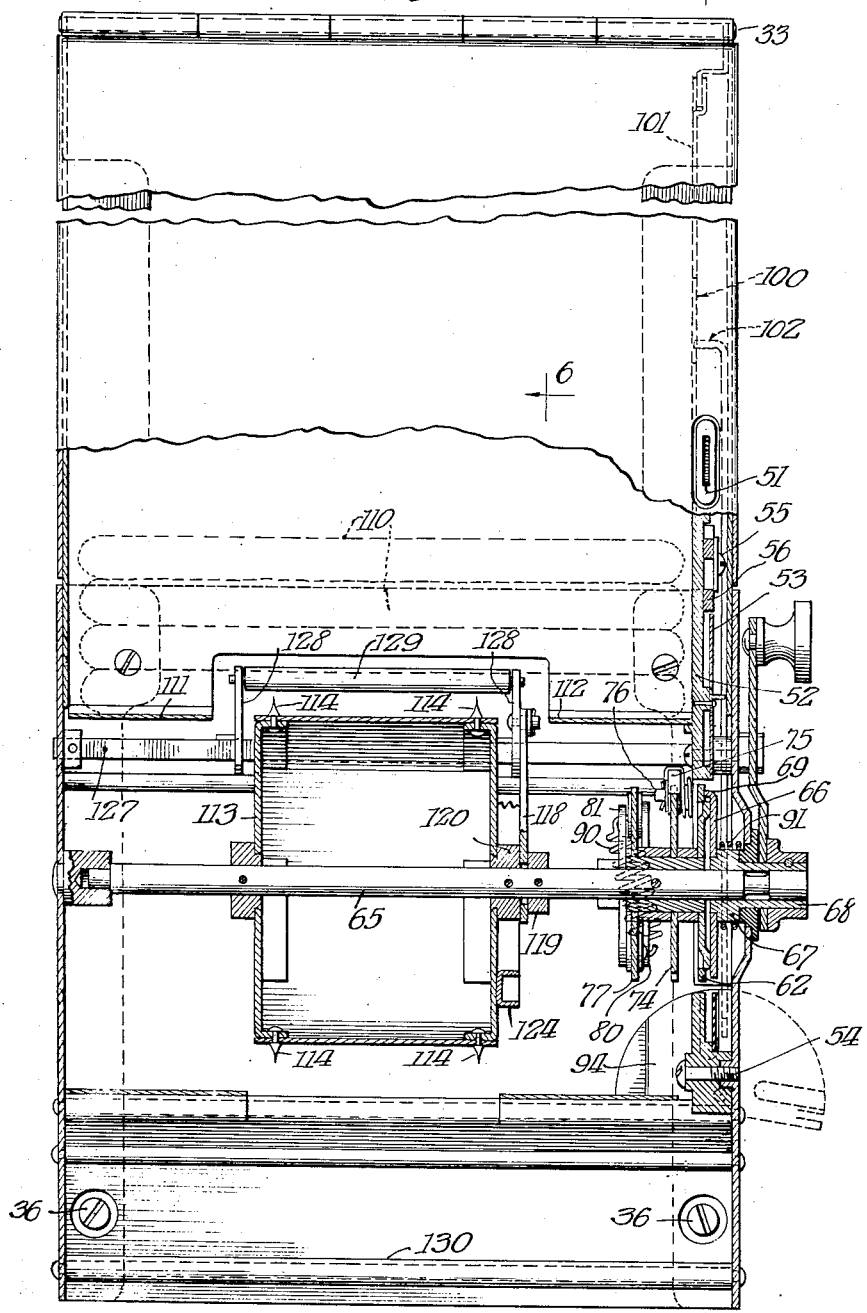
Fig. 1 is a front elevation, partially in section, of the vending machine.

Referring to the drawings, the vending machine comprises a casing within which is mounted an article-discharging mechanism and an operating device for this mechanism which is rendered operative by the insertion of a coin of proper denomination in the coin chute provided for the purpose.

The casing comprises a main or mechanism housing 30 upon which is mounted an upstanding article container or chute 31. A cover 32 is hingedly mounted at 33 on the container and is adapted to be secured in closed position by a lock 34 or other suitable means. This cover is provided with side flanges 35 which overlie the side walls of the container. The casing is preferably made of light gauge sheet metal and is adapted to be secured upon a wall or other form of support by suitable fasteners as 36. The container 31 fits within the open top of the main housing 30 and is attached thereto by screws 360 or other suitable means. The main housing is constructed with a sliding rear door 37 to provide access to the discharging mechanism when the machine is not mounted upon a support.

The coin-controlled apparatus is provided with the usual coin chute 50 leading from a coin slot 51 in the front wall of the container. This chute is formed between vertical plates 52 and 53, the former being channeled. The plate 52 is secured to the side wall of the casing, as at 54, and the plate 53 is attached to the plate 52, as at 55. A magnet 56 is secured to the plate 52 with its operating ends forming a portion of the inner edge of the chute at the point where the chute turns abruptly downward so that each coin passing through the chute rolls or slides over these ends. The main chute is divided into two branches by the rib or partition 57 on the plate 52, the branch chute 58 leading to a coin ejection opening 59 in the casing and the branch 60 conducting the coin to the operating mechanism. If an iron slug is inserted in the coin chute, it will be sufficiently attracted by the magnet 56 to cause it to drop into the branch chute 58 and be ejected from the casing without rendering the discharge mechanism operative. On the other hand, when a silver coin is placed in the coin slot it will not be attracted by the magnet and will drop vertically into the branch chute 60 leading to the operating mechanism. A proper coin, as 61, upon passing through the chute 60 is deposited in one of the pockets 62 formed between lugs 63 on the disk 64 fixed upon the propeller shaft 65. The coin is held in one of these pockets by a disk 66 parallel to the disk 64 and substantially contacting with the outer faces of the lugs 63. The disk 66 is secured to a collar 67 upon a sleeve 68 free upon the shaft 65 and is provided with peripheral flanges or lugs 69 bent toward the disk 64. An operating handle or lever 70 is secured upon the sleeve 68. When a coin enters one of the pockets 62, rotation of the lever 70 produces a corresponding rotation of the disk 66. This rotation of the lever 70 brings one of the lugs 69 into engagement with the coin and causes the disk 66 to operate the propeller shaft 65 through the medium of the coin and the disk 64. The periphery of the disk 64 is provided with equally spaced notches forming teeth 71, one of these notches normally containing the operative end of a spring-pressed detent 72 free upon the short shaft 73 supported in a bearing in the plate 52. The initial advance of the coin by the rotation of the lever 70 in counter-clockwise direction (Fig. 3) brings the coin into engagement with this detent and causes the same to be raised before the detent comes into engagement with the tooth 71 at the end of the notch. If rotation of the lever were attempted at a time when no coin of proper size was in the pocket in the disk, the detent would not be lifted and this detent would act to stop such rotation.

Figure 12:
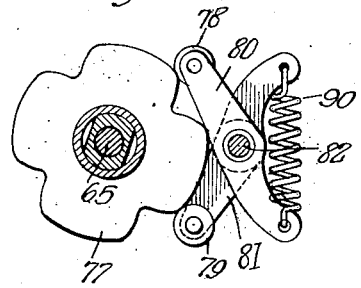
Fig. 12 is the same as Fig. 11 but with the parts in an intermediate position.
Figure 11:
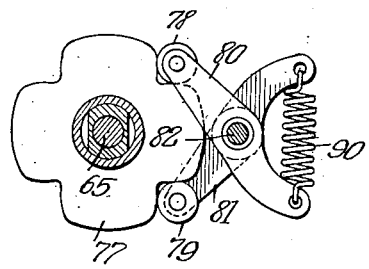
Fig. 11 is a detail view of the coin mechanism in initial position.
Figure 13:
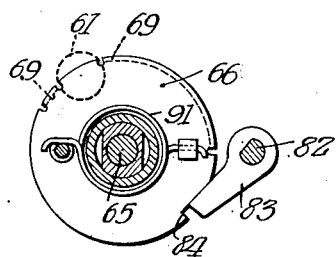
Fig. 13 is a detail view of a portion of the coin-controlled mechanism.
Figure 14:
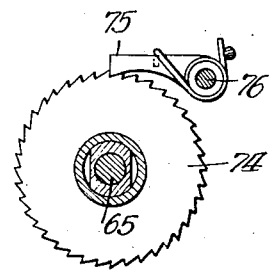
Fig. 14 is a detail view of the ratchet mechanism.
Figure 15:
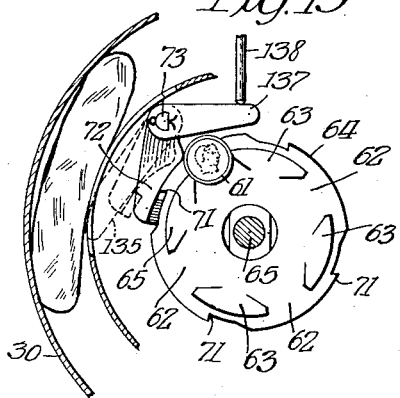
Figs. 15 and 16 are detail views, partially in section, of a portion of the coin-controlled mechanism.
Figure 16:
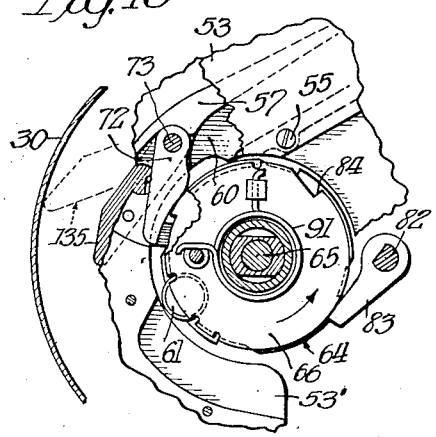

A ratchet wheel 74 is fixed upon the revoluble propeller shaft 65 and engaged by a spring-pressed pawl 75 which prevents rotation of the shaft in reverse or clockwise direction. The pawl 75 is mounted on the pivot pin 76 in the plate 52. A lobed cam 77 is likewise secured upon the shaft at an interval from the ratchet wheel 74. This cam operates rollers 78 and 79 respectively, carried by levers 80 and 81 mounted intermediate their ends on the short shaft 82 supported in a bearing in the plate 52. The lever 80 is loose upon the shaft 82 while the lever 81 is fixed thereon. At the outer end of the shaft 82 is fastened a detent 83 which is normally in position to engage a tooth 84 on the periphery of the disk 66 to prevent the forward rotation of this disk. When a proper coin is within one of the pockets 62, the starting of the rotation of the lever 70 immediately causes the cam 77 to lift the detent 83 before the disk 66 has rotated sufficiently to bring the tooth 84 into engagement with this detent and therefore the rotation of the disk 66 may continue. This lifting of the detent is accomplished by the abrupt lobe of the cam quickly forcing the roller 79 away from the axis of the shaft 65. In Fig. 11 is illustrated the normal or initial positions of the cam, roller and lever. Fig. 12 illustrates the relative position of these parts after the rotation of the shaft 65 has commenced. The roller 79 is riding out upon the lobe of the cam and the lever 81 has previously rotated the shaft 82 sufficiently to move the detent 83 out of position to engage the tooth 84. The initial positions of the disk 66 and detent 83 are illustrated in Fig. 13. The corresponding ends of the levers 80 and 81 are connected by a spring 90. The roller 78 leads the roller 79 by one lobe distance and aids in retaining it firmly against the periphery of the cam. As soon as the propelling handle or lever 70 has advanced its full distance and is released by the operator, a spring 91 causes this lever, the sleeve 68 and disk 66 to be returned to their initial position. The travel of the lever 70 is determined by the stop lugs 92 and 93 on the side wall of the casing. This lever 70 is shown in its initial position in solid lines in Fig. 2 of the drawings and at the completion of its forward stroke in dotted lines.

As soon as the lever 70 is released at the termination of its advance, the coin drops from the pocket in the disk 64 into a coin box 94. This coin box is pivotally mounted on the rod 95 supported by inwardly projecting lugs 96 on the side wall of the casing and the outer wall 97 of the box forms in closed position a portion of this wall (Figs. 2 and 19). The coin box is normally held in closed position by a spring actuated latch 98 which enters a slit 99 in the side wall of the box. When the casing is opened the collector may open the coin box by inserting his finger through the opening 100 in the inner wall 101 of the casing and pressing upwardly on the inwardly bent upper end 102 of the latch. The coin box is shown in open position in dot in Figs. 1 and 19. As soon as the box is moved to closed position, the latch is forced into the slit 99 by the spring 104. The coin box cannot be opened from the outside of the casing.

The articles 110 to be vended are stacked in the container 31 in the manner indicated in Fig. 6. The end portions of the bottom article in the stack rest upon guides 111 and 112 projecting inwardly from one side wall of the casing and the plate 52 respectively (Fig. 10). The central portion of this article is supported by the propelling drum 113 fixed upon the shaft 65 and located between the guides. The periphery of this drum is preferably provided with radially projecting pins 114 which pierce the article resting on the drum and cause this article to be drawn forward as the drum is rotated. The drum is provided at its edges with a plurality of radial lugs 115 arranged in oppositely disposed pairs and each pair carrying a sleeve or roller 117. The spacing of these rollers depends upon the width of the articles, the interval being just sufficient to admit an article. An arm 118 is freely mounted on the shaft 65 between fixed collars 119 and 120, the shaft passing through an elongated slot 121 in the arm to permit a limited radial movement of the arm. A roller 122 is mounted on a stud 123 on this arm and rests within a channel 124 secured upon the end face of the drum. This channel forms a cam groove to move the arm 118 substantially inwardly and outwardly during the partial rotation of the drum. The outer end of the arm 118 is pivotally connected at 125 to a rocker member 126 attached to the rock shaft 127. This rocker member consists of a pair of spaced arms 128 secured upon the shaft and having a roller 129 trunnioned in the outer ends thereof. The in and out movement of the arm 118 causes the rocker member to correspondingly swing. When the drum is in its initial position (Fig. 6), the roller 129 contacts with the rear end of the lowermost article in the stack. As soon as the rotation of the drum is started by the propelling lever, the roller 129 swings inwardly, pressing the article along the guides 111 and 112 and thus assisting the pins 114. Almost immediately after the roller 129 has completed its forward stroke, one of the rollers 117 comes into position behind the rear end of the article and takes up the propulsion. During the return stroke of the roller 129, this roller supports the rear portion of the article next above the one being withdrawn. By the time the withdrawal is complete, the roller 129 has returned to its initial position and the next article is allowed to drop upon the guides into what I have designated the A position. The article just withdrawn has moved to B position. The next advance of the drum moves the article in A position to the B position and the article in B position to the discharged position C. In this discharged position the article rests on a shelf 130 ready for removal by the operator. In passing from B to C position the article was detached from the pins on the drum by the portions 131 of the guides and drops by gravity upon the shelf. The weight 132 is preferably provided at each of its ends with an upwardly projecting flange as 132' and a similar depending flange as 132". The depending flanges prevent the weight from dropping on the roller when the last article has been withdrawn. These flanges will then rest on the guides 111 and 112. The corresponding flanges on the upper face of the weight perform a similar function when the weight is placed in the container in inverted position. The pins 114 engage the lowermost article at widely spaced points and prevent this article from twisting on the drum during the withdrawal operation.

The device is operated sufficiently to bring one of the articles to B position at the time the article container is filled so that each subsequent operation of the lever 70 will cause the discharge of an article. A weight 132 is preferably placed upon the top of the stack to press the articles downwardly in the container. An advantageous form of weight is shown in detail in Fig. 9 in which finger openings 133 are provided to enable the weight to be easily grasped and lifted, when the container is being filled. A window 134 is provided in the casing to expose the article in B position. If no article is in this position the word "Empty" will show. This word is placed upon the drum 113 in each article position and it is concealed by the article when one is present. When no article is present in B position, a detector arm 135 fixed on the revoluble shaft 73 is permitted to move outwardly into the position indicated in dot in Fig. 3. An arm 137 is secured upon the opposite end of this shaft 73 and the outer end of this arm operates upon a wire 138 to maintain this wire in raised position, as indicated in solid lines in Fig. 3, and to permit it to drop into the dotted position when the arm 135 is in its outer or extended position. The wire 138 is vertically slidable in a support 139 at the top of the plate 52. The upper end 140 of the wire 138 is bent downwardly to partially close the coin slot 51 when this wire is in its lower position or, in other words, when no article is in B position. Thus it will be evident that no coin can be inserted in the coin slot when there is no article in position to be delivered. A small spring 141 yieldingly forces the wire 138 downwardly. This spring also acts through the wire, the arm 137 and the shaft 73 to yieldingly press the arm 135 outwardly.

From the foregoing description, it will be evident that my improved vending machine is simple and strong in construction and efficient in operation. The machine registers empty when the last article has been withdrawn and in addition means are provided to prevent the insertion of a coin in the slot in case the person fails to notice this registration. The magnet prevents the use of slugs. Coins of improper size cannot enter the coin slot. The coin performs the double function of disengaging a detent and forming the operative connection between the driving and driven disks.

The ratchet construction prevents rotation of the article-discharging mechanism in the reverse direction. The combination of means for withdrawing the bottom article from the stack not only insures positive withdrawal but eliminates any possibility of the article being torn or crumpled during delivery. This is a very advantageous feature as the article for which the machine is particularly intended is in the form of a soft package. Separate and distinct detents normally prevent the rotation of the driving and driven disks and it is necessary that both of these detents be simultaneously held out of engaging position to enable the article discharging drum to be operated by the lever provided for the purpose. The detent 72 also prevents the independent operation of the discharging drum by means of a wire hook or other similar contrivance which might be inserted through the discharge opening and caused to engage the drum or some part connected thereto, such as the roller 117 in front of the article in position B. This roller and the pins on the drum would also prevent the article being drawn out by some such tool.

I am aware that many changes in the construction and arrangement of parts may be made without departing from the spirit of my invention and I reserve the right to make all such as fairly fall within the scope of the following claims.

I claim as my invention:

1. In a vending machine, the combination with a casing including an article container, of a revoluble drum disposed in said casing adjacent to said container, means including a series of pins projecting from the periphery of said drum for engaging the bottom side of the lowermost article in said container adjacent its forward edge for withdrawing said article therefrom when said drum is rotated, means for actuating said drum, and additional means separate from the drum and operating to engage behind the lowermost article for assisting the first said means in delivering the article from the container.

2. In a vending machine, the combination with a casing including an article container, of a revoluble drum disposed in said casing adjacent to said container, means including radially projecting pins adapted to engage the bottom-side of the lower-most article in the container, for withdrawing said article therefrom, and spaced transverse members on the periphery of said drum for engaging the rear edge of said lowermost article after said article has been partially withdrawn by said pins when said drum is rotated, and means for actuating said drum.

3. In a vending machine, the combination with a casing including an article container, of a revoluble drum in said casing adjacent to said container, a presser member movable relative to said drum, said presser member operating upon the article and co-operating with the drum to cause the discharge of the lowermost article from said container when said drum is rotated, and means for actuating said drum and said member.

4. In a vending machine, the combination with a casing including an article container, of a discharge drum in said casing adjacent said container, a presser member operating upon the article and actuated by the movement of said drum and movable relative thereto to assist said drum in causing the discharge of the lowermost article from said container when said drum is rotated, and means for actuating said drum.

5. In a vending machine, the combination with a casing including an upstanding article container, of discharging mechanism including a rotatable drum operative to eject the lowermost article from said container and a cam actuated presser member operating to engage behind the article to assist in ejecting the same, and means for actuating said discharging mechanism.

6. In a vending machine, the combination with a casing including an article container, of discharging mechanism within said container including a revoluble drum, a rocking presser member, and an operating member for said presser member actuated by the movement of said drum.

7. In a vending machine, the combination with a casing including an article container, of discharging mechanism in said casing including a revoluble drum disposed beneath said container, article-engaging means on said drum, means for releasing the article from said engaging means when said article has been moved by said drum to the discharging position, means for propelling the article after being released by the second recited means, and means for actuating said drum.

8. In a vending machine, the combination with a casing including an article container and a delivery shelf, of discharging means in said casing including a revoluble feed drum, article engaging means on said drum, guides forming an arcuate passageway disposed adjacent to and substantially concentric with said drum for guiding the articles as they are discharged from the container to the delivery shelf and having a portion tangential to said drum for releasing the article from said engaging means when said article has been moved by said drum to discharging position, and means for actuating said drum.

9. In a vending machine, the combination with a casing including an article container, of a revoluble drum disposed in said casing adjacent to said container to withdraw the lowermost article therefrom, means on said drum for engaging the bottom of said article adjacent its forward edge to draw the article from said container, said means being disposed at widely spaced points to prevent the twisting of the article thereon during the withdrawal operation, and additional means engaging behind said article for assisting in delivering the article.

10. In a vending machine, the combination with a casing including an article container, of a revoluble drum disposed in said casing adjacent to said container to withdraw the lowermost article therefrom, pins projecting from said drum adapted to pull said article from the bottom of the container by engaging it adjacent its forward edge, said pins being widely spaced on the drum to prevent twisting of the article on the drum during the withdrawal operation, and additional means engaging behind said article for assisting in delivering the article.

11. In a vending machine, the combination with a casing including a container, of a pivotally mounted member adapted to engage the rear edge of the article to be vended to propel said article from the container, and means for rocking said member on its pivot comprising a cam, and a link pivotally connected at one end to said member and having means engaging said cam whereby the latter is effective to actuate said link.

12. In a vending machine, the combination of a casing, including a container, of a revoluble drum in said casing, means on said drum for propelling the article to be vended from the container, and means for initially assisting said propelling means comprising a pivotally mounted member having means for engaging the article and means for rocking said pivotal member comprising a cam and a link, said link being adapted to transmit the action of said cam to said pivoted member.

13. In a vending machine, the combination of a casing including a container of a revoluble drum in said casing, means on said drum for propelling the article to be vended from the container and means for initially assisting said propelling means.

14. In a vending machine, the combination of a container for articles to be vended, a delivery shelf disposed at a distance from said container, means for propelling the articles in said container therefrom one at a time and depositing same on said delivery shelf, guiding means forming an arcuate passageway for guiding the articles as they are propelled from said container to said shelf, said arcuate passageway being effective to deposit the articles on said shelf in inverted position relative to their respective positions in the container.

15. A vending machine embodying a casing including a container, a revoluble drum in said casing, means connected with the drum for propelling from the container the article to be delivered, and additional means for engaging the article for initially assisting in propelling the article, the last recited means being responsive in its action to the rotation of said drum.

16. A vending machine embodying a casing including a container, a revoluble drum in said casing, means connected with the drum for propelling from the container the article to be delivered, additional means embodying a pivotally mounted member adapted to engage and assist in propelling the article, and a cam and link connection between the drum and said pivoted member whereby the latter will be responsive in its action to the rotation of the drum.

17. A vending machine embodying a casing including a container for the articles, a receiver, an extended passageway of arcuate shape for receiving the articles from the container and delivering them to the receiver, a rotatable drum, a plurality of spaced and separate means connected with the drum for engaging and propelling the article, and additional means operable upon the article intermediate the said spaced means for assisting in propelling the articles from the container.

18. A vending machine embodying a casing including a container for the articles, a receiver, an extended passageway of arcuate shape for receiving the articles from the container and delivering them to the receiver, a rotatable drum, a plurality of spaced and separate means connected with the drum for engaging and propelling the article, and additional means operable upon the article intermediate the said spaced means for assisting in propelling the articles from the container, the said additional means being responsive in its operation to the rotation of said drum.

19. A vending machine embodying a casing including a container for the articles, a receiver, an extended passageway of arcuate shape for receiving the articles from the container and delivering them to the receiver, a rotatable drum, a plurality of spaced and separate means connected with the drum for engaging and propelling the article, and additional means operable upon the article intermediate the said spaced means for assisting in propelling the articles from the container, a portion of said passageway operating to release the article from one of the said engaging means when the article has been moved by the drum to a discharging position.

GEORGE WEISS.